United States Patent [19]

Dufrenne

[11] Patent Number: 5,386,092

[45] Date of Patent: Jan. 31, 1995

[54] FAST RESPONSE WELD HEAD

[75] Inventor: Gerald Dufrenne, LaVerne, Calif.

[73] Assignee: Unitek Equipment Inc., Monrovia, Calif.

[21] Appl. No.: 998,781

[22] Filed: Dec. 28, 1992

Related U.S. Application Data

[63] Continuation-in-part of Ser. No. 787,010, Nov. 4, 1991, Pat. No. 5,225,647.

[51] Int. Cl.$^6$ ............................................. B23K 11/24
[52] U.S. Cl. .......................... 219/86.32; 219/86.51; 219/86.7; 219/117.1
[58] Field of Search ............... 219/86.51, 110, 109, 219/117.1, 86.32, 86.7

[56] References Cited

U.S. PATENT DOCUMENTS

| | | | |
|---|---|---|---|
| 3,316,383 | 4/1967 | Hill | 219/86 |
| 3,585,347 | 6/1971 | Needham et al. | 219/110 |
| 4,192,986 | 3/1980 | Udagawa et al. | 219/137 |
| 4,400,610 | 8/1983 | Murakami et al. | 219/124.02 |
| 4,419,558 | 12/1983 | Stiebel | 219/109 |
| 4,538,047 | 8/1985 | Nakano et al. | 219/125.1 |
| 4,540,869 | 9/1985 | Yasuoka | 219/124.34 |
| 4,590,577 | 5/1986 | Nio et al. | 364/513 |
| 4,597,519 | 7/1986 | Kurtz et al. | 228/102 |
| 4,605,833 | 8/1986 | Lindberg | 219/56.22 |
| 4,629,860 | 12/1986 | Lindbom | 219/125.1 |
| 4,670,641 | 6/1987 | Porsander et al. | 219/125.1 |
| 4,789,095 | 12/1988 | Kobayashi | 228/102 |
| 4,817,848 | 4/1989 | Gabaldon | 228/102 |
| 4,824,005 | 4/1989 | Smith, Jr. | 228/1.1 |
| 4,952,773 | 8/1990 | Orsos et al. | 219/124.34 |
| 5,063,279 | 11/1991 | Rossi | 219/86.51 |
| 5,138,127 | 8/1992 | Fries et al. | 219/86.51 |

OTHER PUBLICATIONS

T. G. Chladek, et al., IBM Technical Disclosure Bulletin, vol. 26 No. 3A Aug. 1983 (pp. 1219–1221).
ARO NC Resistance Welding, Electric Motor Operated Gun, Undated, (4 pages).

*Primary Examiner*—Clifford C. Shaw
*Attorney, Agent, or Firm*—Christie, Parker & Hale

[57] ABSTRACT

A fast response weld head which employs a control system to allow user control of critical welding parameters such as speed, force, position, and duration. In one embodiment, the control system includes a position servo loop attached to a motor driven output shaft on which a welding electrode is mounted utilizing a follow-up spring assembly. During a weld cycle, the control system moves the welding electrode toward a workpiece at a rapid user-defined rate. Just prior to when the electrode is reduced to prevent damage to the parts. When contact is made, the force exerted by the electrode on the workpiece is measured until the measured force equals a user-defined optimum welding force. A user-defined weld current is enabled to the electrode. When the weld is complete, the welding electrode is automatically raised by the control system, releasing all pressure on the workpiece. In a second and presently preferred embodiment, a linear magnetic actuator is utilized in lieu of a motor to drive the output shaft. The follow-up spring assembly is eliminated. The force required to keep constant pressure on the weld is now provided by programming the linear actuator to exert a very short pulse of force to maintain constant pressure on the weld as the weld softens at the onset of applications of weld current. Force is then returned to normal force until the weld is complete.

23 Claims, 7 Drawing Sheets

1. PATH OF ELECTRODE TIP
2. PATH OF ELECTRODE TIP IF NO WORKPIECE IS PRESENT

FAST RESPONSE WELD HEAD

This application is a continuation-in-part of U.S. application Ser. No. 07/787,010 filed Nov. 4, 1991 and entitled MOTORIZED WELD HEAD, now U.S. Pat. No. 5,225,647.

FIELD OF THE INVENTION

The present invention relates to a device for resistance welding, and more particularly to a fast-response weld head having servo control for sensing and controlling the speed, direction, force and duration of the weld or bonding head.

BACKGROUND OF THE INVENTION

In resistance welding, heat and pressure are used to fuse metals together. Heat generated by the resistance of the work pieces to the flow of electricity either melts the material at the interface, or at least reduces its strength to a level where the surfaces of the materials become plastic. When the flow of current stops, the electrode force is maintained, for a fraction of a second, while the weld rapidly cools and solidifies.

Broadly speaking, there are several parameters which can be controlled in the resistance welding process, these being the electrode force on the workpiece, the magnitude of the weld current, and the duration of the weld current. These parameters have different optimum values for different materials being welded. If these parameters are not closely controlled, the welds obtained can vary in quality.

Maintaining weld quality in integrated circuit packages and micro-circuit components and assemblies is particularly important. Precision welding equipment is used for the welding of these extremely small items. The weld heads for most prior art precision welding equipment are driven manually or pneumatically through a spring nest. Because of the limitations in control of these types of systems, a number of desirable control features are either very difficult or impossible to obtain.

With such prior art welding equipment there is no practical way to program in different speeds, forces or positions. Also, there is no satisfactory way to achieve the desired speed of response of the weld head to the onset of welding current or to prevent the force from continuing to increase after the weld has been completed, which can cause damage to the weld or the entire component.

Not only is there a problem with not being able to control the force with prior art welding equipment, additionally, there is no means for automatically controlling the speed and the duration of contact of the weld or bonding head and for varying the amount of force during contact. Therefore, there exists a need for the automatic control of speed, response time, force, duration and pressure of the weld head in a precision welding device for the welding of a broad range of precision applications such as integrated circuit packages and micro circuit components.

SUMMARY OF THE INVENTION

A principal object of this invention is to provide an apparatus and method for precisely controlling welding parameters essential for optimum welding. An equally important objective of the present invention is that it is readily controlled by computer-generated signals for use with automated equipment or by a microprocessor.

In order to achieve these objectives, the apparatus and method controls the speed, position, force and the rate of force of contact of the welding electrodes with the workpiece, as well as the duration of the weld current. Furthermore, the invention provides a method for applying and controlling different user-defined forces for predetermined durations of time before, during and after a weld current is enabled to the electrode.

These highly desirable features are incorporated into a mechanical weld head driven by a control system containing a position servo loop. The loop, controlled by user-defined input voltages, comprises an input resistor, a feedback resistor, a servo amplifier, a magnetic linear actuator, and a position transducer. The actuator is attached to the welding electrode through a linear output shaft which can be driven toward and away from a workpiece. The linear motion of the output shaft is coupled to a position transducer, allowing for precise position measurements. Moreover, speed can be controlled because the rate the shaft moves is directly proportional to the rate of change of the input voltage to the loop. Therefore, the output shaft, and hence the welding electrode, can be positioned anywhere in its operating span at any speed within the capability of the linear actuator.

The speed and position control features allow for fast, precise welding. Once the command is given to begin a weld cycle, the welding electrode can be driven rapidly to a search position thousandths of an inch above the maximum height of the workpiece. Then the speed of the output shaft can be significantly reduced as the electrode contacts the workpiece to prevent damage to especially fragile workpieces and to prevent dislodging of the piece part in the welding fixture due to shock.

The force control feature of this invention is provided by the magnetic linear actuator. The output shaft of this actuator is attached to the welding electrode, allowing the electrode to be driven by the shaft. As the shaft and electrode are driven toward a workpiece, the electrode will first contact the rigid workpiece and begin to apply force up to a first predetermined amount. The shaft stops momentarily, then accelerates rapidly during the interval when the weld current is fired, causing additional mechanical force to be exerted on the workpiece for a preselected amount of time during the weld current interval, returning prior to the termination of the weld current to the first lesser predetermined amount of force.

A linear magnetic actuator of the type described in U.S. Pat. No. 3,889,139 is suitable for use in the apparatus according to the present invention. Other examples include U.S. Pat. Nos. 3,505,544; 3,666,977 and 3,576,454.

In order to maintain a desired force for uniform welding of several similar workpieces, the actuator is controlled or programmed to exert different forces on the workpiece before, during and after the interval when weld current is actually flowing. In a typical welding sequence, the electrode contacts the workpiece, increases the force to a first level and holds that force for a predetermined interval before an additional transient force is exerted. When the forces reaches the first level, welding energy is applied for a programmed interval. Before the transient force is exerted, the input current to the actuator is held constant, maintaining the position of the output shaft as well as the force applied by the electrode on the workpiece. In some instances there may be a firing delay before weld current is supplied to the welding electrode. This feature is desirable to allow any mechanical vibration of the weld head to diminish before the actual weld energy is applied.

When the user-defined weld current is delivered to the electrode, the workpiece softens and the preprogrammed additional transient amount of force is applied by the electrodes to the workpiece. Prior to the termination of the weld current, the force is reduced and continues at the lower force level as the weld cools. This weld current starts after welding electrode force is applied and stops before the electrode force is removed. Finally, the electrode is raised on cue from the control system. A precise, repeatable weld has been performed.

As can be readily inferred from this summary, the features of this invention allow for precision control of critical welding parameters not achievable in prior art welding systems. These features are extremely important for the optimum welding of small to large workpieces starting from small, fragile components and chips to and including automotive body welding applications..

BRIEF DESCRIPTION OF THE DRAWINGS

The invention will now be described in more detail with reference to the accompanying drawings in which.

DETAILED DESCRIPTION OF THE INVENTION

Figure 1:
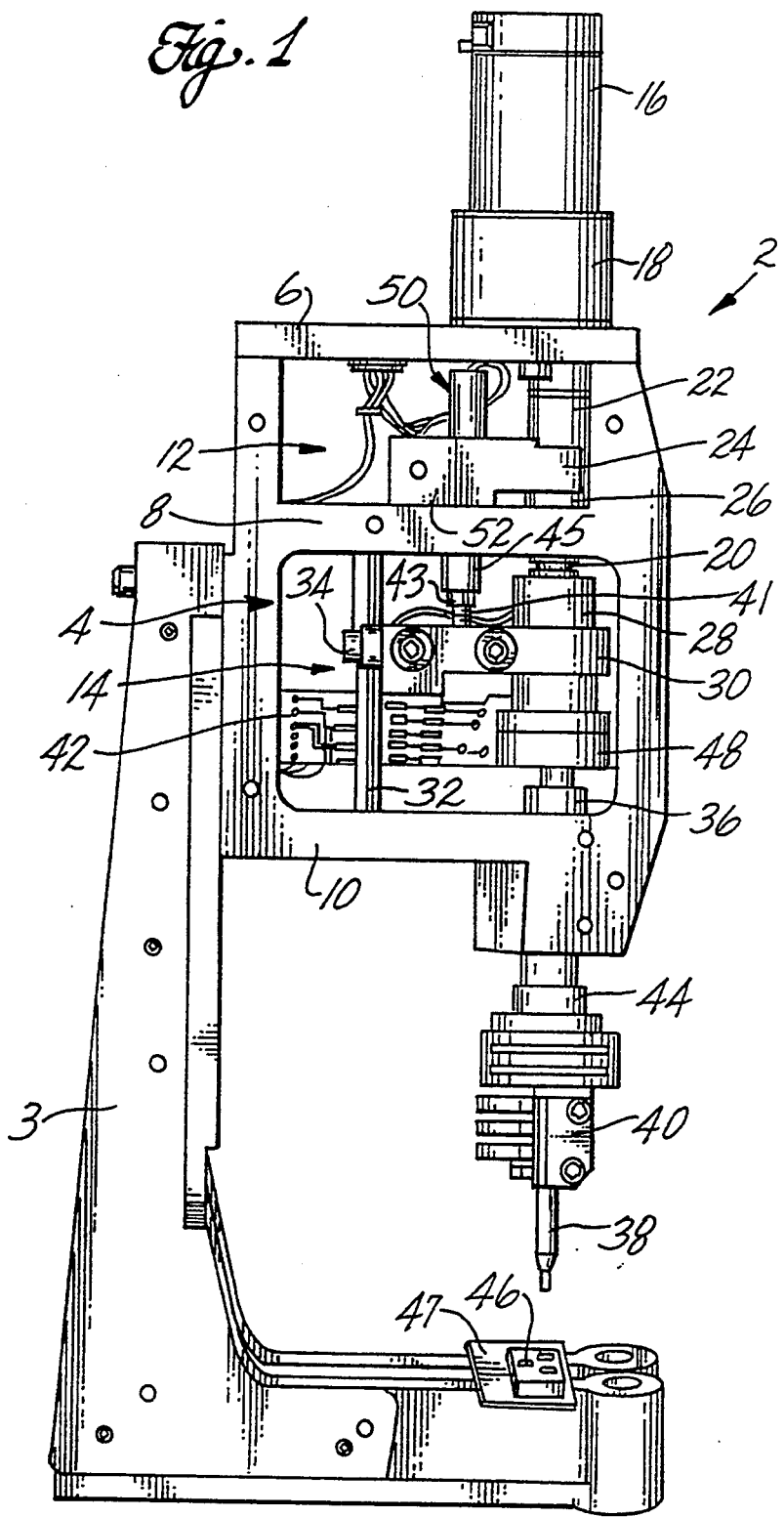
FIG. 1 is a side elevation showing a motorized embodiment of a fast response weld head apparatus according to the present invention.

A motorized weld head apparatus according to the present invention incorporates control apparatus which enable a user to control critical parameters of a weld cycle via servo controlled motion. In FIG. 1, a presently preferred embodiment of the subject weld head apparatus provides a welding electrode to be moved upwardly and downwardly to precise locations along the z-axis of the electrode at a variable speed. As a result of position and speed control, both the rate of force and the amount of force the electrode exerts on a workpiece can be varied and controlled as required for optimum welding.

Figure 4:
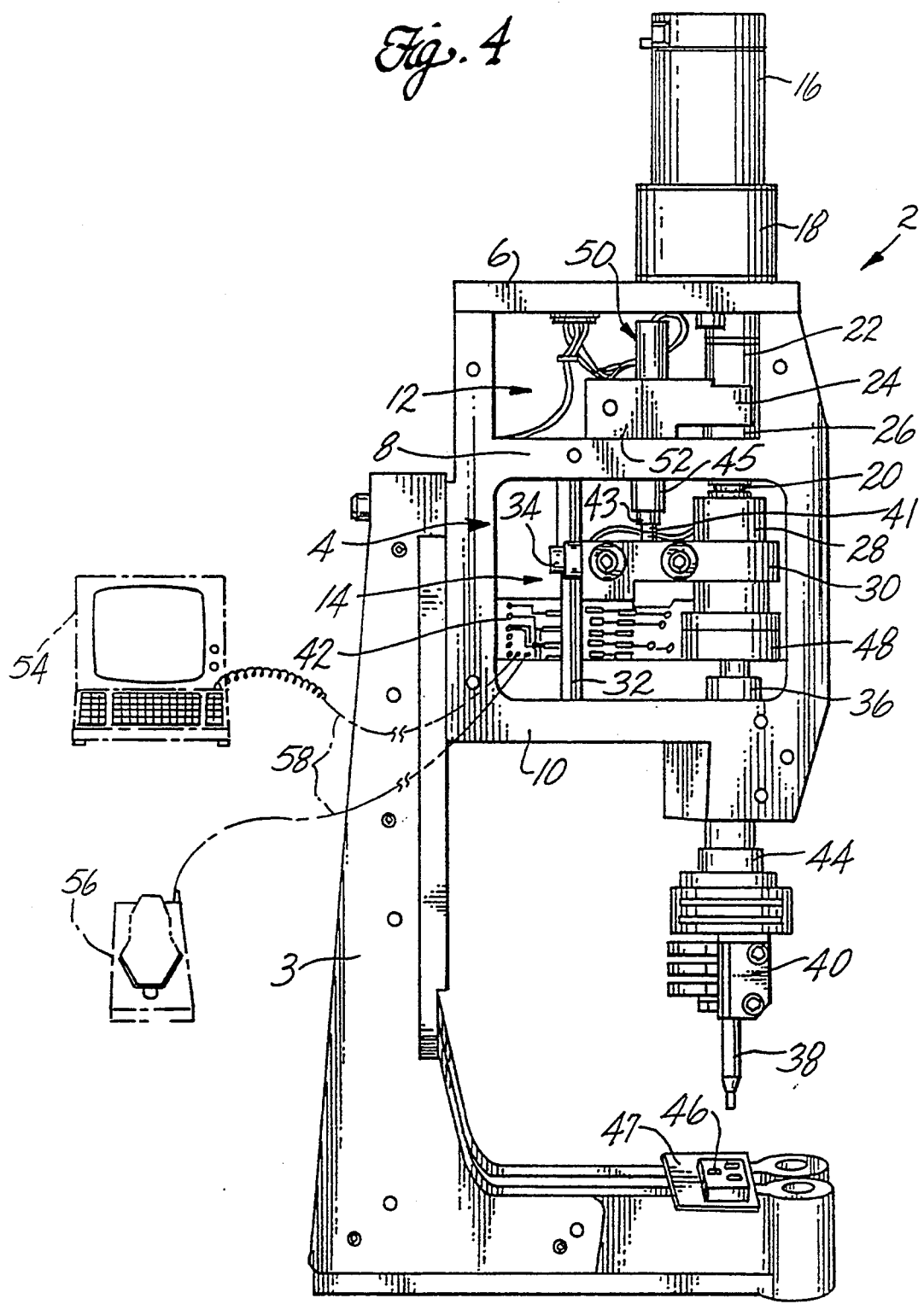
FIG. 4 is a side elevation showing the motorized weld head apparatus along with user controls for the weld head.

The various components of the motorized weld head 2 will first be described. Referring to FIG. 1, a support for the weld head comprises a two-legged base 3 to which housing 4 is fixedly mounted. Housing support members including an upper member 6, a middle member 8 and a lower member 10 each extend horizontally across the length of the housing. The three support members together define an upper cavity 12 and a lower cavity 14. Housing 4 supports a drive motor 16 which moves a welding apparatus. The welding apparatus, to be discussed subsequently, includes a welding electrode 38 and an electrode holder 40. Weld apparatus controls including a keyboard 54 and a foot pedal 56 shown in FIG. 4, are connected to circuit board 42 through cables 58. The circuit board containing the amplifier for the control system, fixedly attaches to supports in the lower cavity of the housing. The remaining elements of the control system, to be discussed subsequently, are housed external to the weld head in, for example, the keyboard controls 54 (JIG. 4) or an external power supply (not shown). Transducer apparatus 48,50, for measuring both the applied force exerted on a workpiece 46 by the welding electrode and the position of the electrode relative to the workpiece, is also mounted on housing 4.

The drive for the welding apparatus comprises a bidirectional DC servo motor 16, a gearcase 18, a motor driven lead screw 20 threaded into a lead nut 28, and an output shaft 36. Motor 16 and gearcase 18 are fixedly mounted on top of upper support member 6. To enable the motor to rotate the lead screw, the upper end of lead screw 20 is attached to the gearcase through an internally threaded universal coupling 22. Both the universal coupling and the lead screw are supported by a thrust bearing 26 fixedly mounted on the upper surface of the middle support member 8 by clamp 52. The thrust bearing protrudes through the middle support member and prevents linear motion of the lead screw as it threads into lead nut 28 within the lower cavity.

To facilitate the conversion from the angular motion of the lead screw 20 to the linear motion of the lead nut 28 along the screw, one end of an antirotation clamp 30 fixedly attaches to the lead nut to prevent angular motion of the nut. The other end of the antirotation clamp is movably mounted to an antirotation shaft 32 by means of bearings 34. The antirotation shaft 32, fixedly mounted to both the middle support member 8 and the lower support member 10, vertically traverses the lower cavity in parallel alignment to the z-axis of the driving apparatus. As the lead nut is displaced by the angular motion of the lead screw driven by the motor, the antirotation clamp slides vertically along the length of the antirotation shaft in conjunction with the displacement of the nut. Thus, angular displacement of lead nut is prevented while linear displacement is allowed.

Located beneath the lead nut and antirotation clamp, output shaft 36 protrudes through the lower support member 10 and provides a mechanical connection between the drive portion and the welding portion of the weld head apparatus. As the lead nut is displaced, shaft bearings (not shown) within the lower support member 10 allow linear motion of the output shaft. The welding portion, comprising an electrode 38 secured by an electrode holder 40, is attached to the output shaft through a compressible spring assembly 44. As the motor 16 drives the welding apparatus downward on cue from the control system the electrode contacts a rigid workpiece 46 on work table 47. The workpiece exerts an upward z-axis force on the spring assembly 44 resulting in its compression. The rigid output shaft, however, continues its downward motion, further compressing the spring assembly 44 along the downward z-axis. The net effect of the combined force from the drive motor and the workpiece is a linear force on the spring assembly proportional to the torque provided by the motor.

To measure the force exerted on the workpiece by the welding apparatus, a load cell 48 or other pressure transducer is mounted between the output shaft and the spring assembly. The load cell accurately measures the force exerted on the workpiece by the welding electrode 38 and generates a voltage output signal proportional to the force which is amplified on the printed circuit board 42 and transmitted to the control system. To measure the linear displacement of the welding apparatus along the z-axis, a position transducer 50 contains a cylindrical shaft 43 that moves linearly within a slightly wider cylindrical transducer body 45 mounted to the middle support member 8 via the transducer clamp 52. A compression spring 41, coaxially mounted around the transducer shaft, keeps the shaft extended to its outward stop. The spring compresses as the antirotation clamp 30 moves upward, keeping the end of the position transducer shaft against the antirotation clamp.

Although one form of motorized weld machinery has been described, it is contemplated that other types of motorized weld heads may be used in conjunction with the servo control system.

A control system for operating the mechanical motorized weld head apparatus which allows the user direct control of critical welding parameters will now be described.

Figure 2:
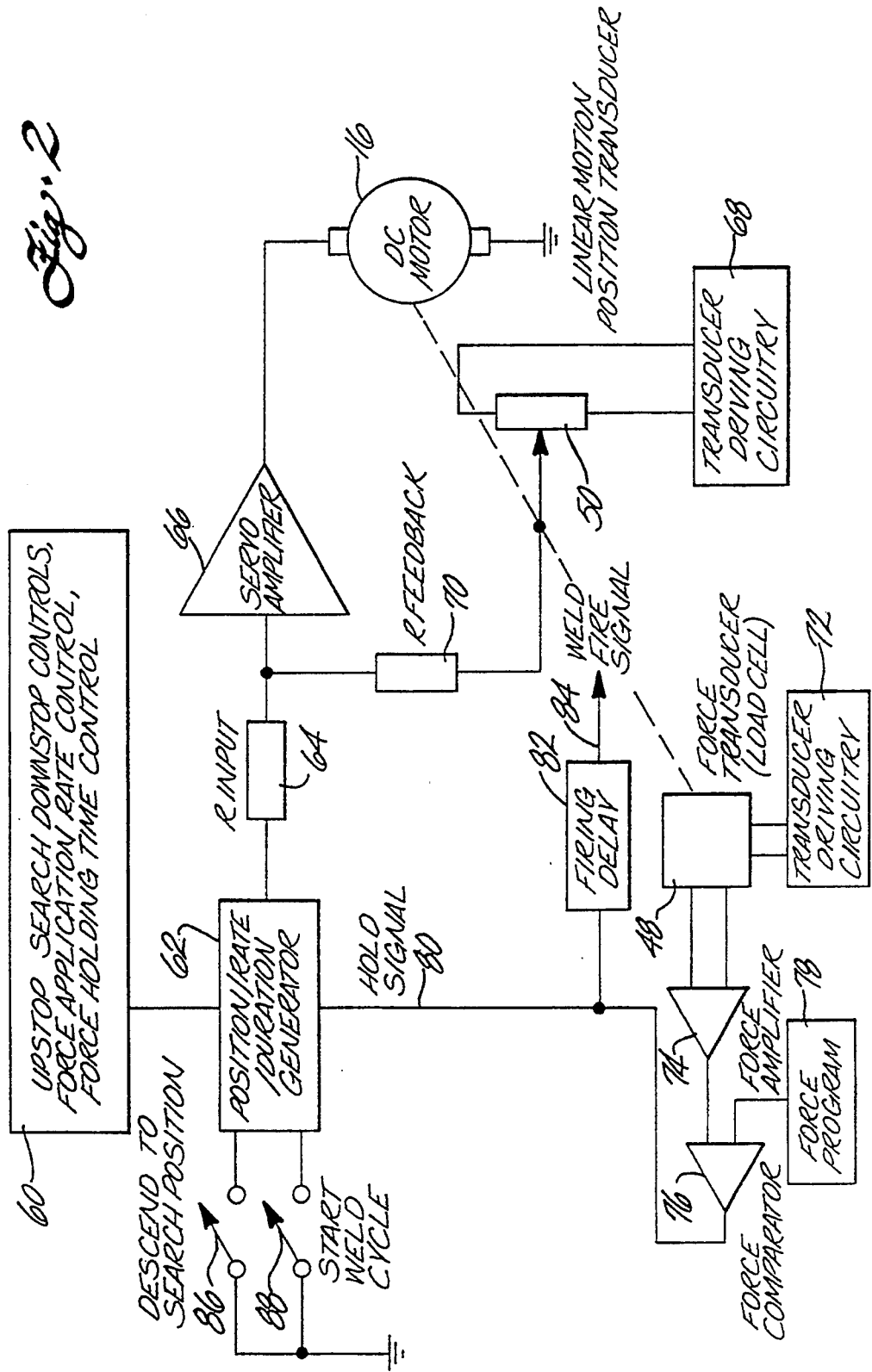
FIG. 2 is a block diagram of the control system for the weld head apparatus of FIG. 1.

A block diagram for explaining the control system is shown in FIG. 2. The user control means 60 allows the user to command the operation of the weld head either directly, with control apparatus such as a keyboard with a display 54 and a foot pedal 56 (FIG. 4) or automatically, with a computer program. Regardless of the means used, the speed, force, duration, and position of the welding apparatus may effectively be controlled. The user controls drive generator 62 to produce a voltage waveform whose shape and amplitude is dependant on the control desired. For example, as the generator receives a command from the user control to increase the speed of the welding apparatus between desired positions, the generator will produce a proportionally increased voltage ramp signal. This voltage ramp produced by the generator is one component of the input voltage to the servo loop circuit.

The servo loop circuit, an essential feature of this control system, comprises input resistor 64, servo amplifier 66, bidirectional DC servo motor 16, linear motion position transducer 50, and feedback resistor 70. As the input voltage enters the servo loop, it first encounters servo amplifier 66 which augments the voltage signal in order to sufficiently power the motor. The voltage delivered to the servo motor is proportional to the voltage input from the generator 62. The more voltage delivered to the motor, the faster it will run. By means of the angular to linear motion conversion apparatus the motor can drive the welding apparatus upwardly and downwardly along the z-axis. The position transducer, independently powered by transducer driving circuitry 68, precisely measures the displacement of the welding apparatus and outputs a voltage signal proportional to the said displacement directly into the feedback loop comprising the feedback resistor. The feedback voltage signal provides a second component of input voltage to the servo amplifier in addition to that produced by the generator. The effect of the feedback loop is that a instantaneous preferred steady state position of the welding apparatus will be maintained by the servo loop.

If the position transducer senses that the welding apparatus is displaced from its instantaneous steady state position, the fundamental operation of the servo loop will drive the apparatus back toward the correct position.

As the welding apparatus is driven downwardly by the motor, it may engage a rigid workpiece 46. A force transducer, comprising the load cell 48, is independently powered by transducer driving circuitry 72. The load cell senses the force exerted on the workpiece and more particularly, on the spring assembly 44, by the welding apparatus and outputs a voltage signal proportional to the amount of force exerted on the workpiece into a force amplifier 74. The resulting augmented voltage signal from the force amplifier provides one of two inputs into a force comparator 76. The second input is provided by a force program 78. The function of the comparator is to continuously compare the two inputs and change state when the inputs are equal.

The force program, as well as the entire means for sensing force in combination with the servo loop, is an important feature of the control system. The force program is a preprogrammed or user controlled means of producing a voltage level which represents the optimum force to be applied by the welding apparatus on to the workpiece. The force program can be programmed either for simple constant force welding applications or, if necessary, for more complex variable force applications.

When the force sensed by the load cell and thus its output voltage equals the output voltage of the force program, the comparator will change state triggering two separate but simultaneous voltage signals. The first signal triggered is a hold signal 80 to the generator 62 which commands the generator to maintain the present input voltage to the servo loop. The function of the hold signal is to maintain the force specified by the force program between the welding apparatus and the workpiece. The hold signal can be manipulated either by the user or by a computer program to maintain the duration of the force as desired. The second signal triggered by the comparator is a firing delay 82 which temporarily blocks current flow to the welding electrode via a switch (not shown) within the weld current control circuit. The purpose of the firing delay is to allow mechanical vibrations of the welding apparatus to significantly diminish prior to enablement of a weld current to the electrode. The firing delay further allows the user to visually check the alignment of the welding apparatus with respect to the workpiece, vary the force exerted on the workpiece by the welding electrode, or compute an appropriate welding current. As with the hold signal, the length of the firing delay can be freely altered by the user or a computer program.

The end of the firing delay triggers a weld fire signal 84 which enables the welding current to flow through the weld current control circuit to the electrode for actual welding. This signal, also programmable or user-controlled, may be long or short depending on the requirements of the weld to the workpiece. The end of the weld fire signal which cuts off user control to the generator 62 by means of switches 86,88. Finally, under direct control of the servo loop, the welding apparatus rises away from the welded workpiece marking the end of a weld cycle.

Figure 3:
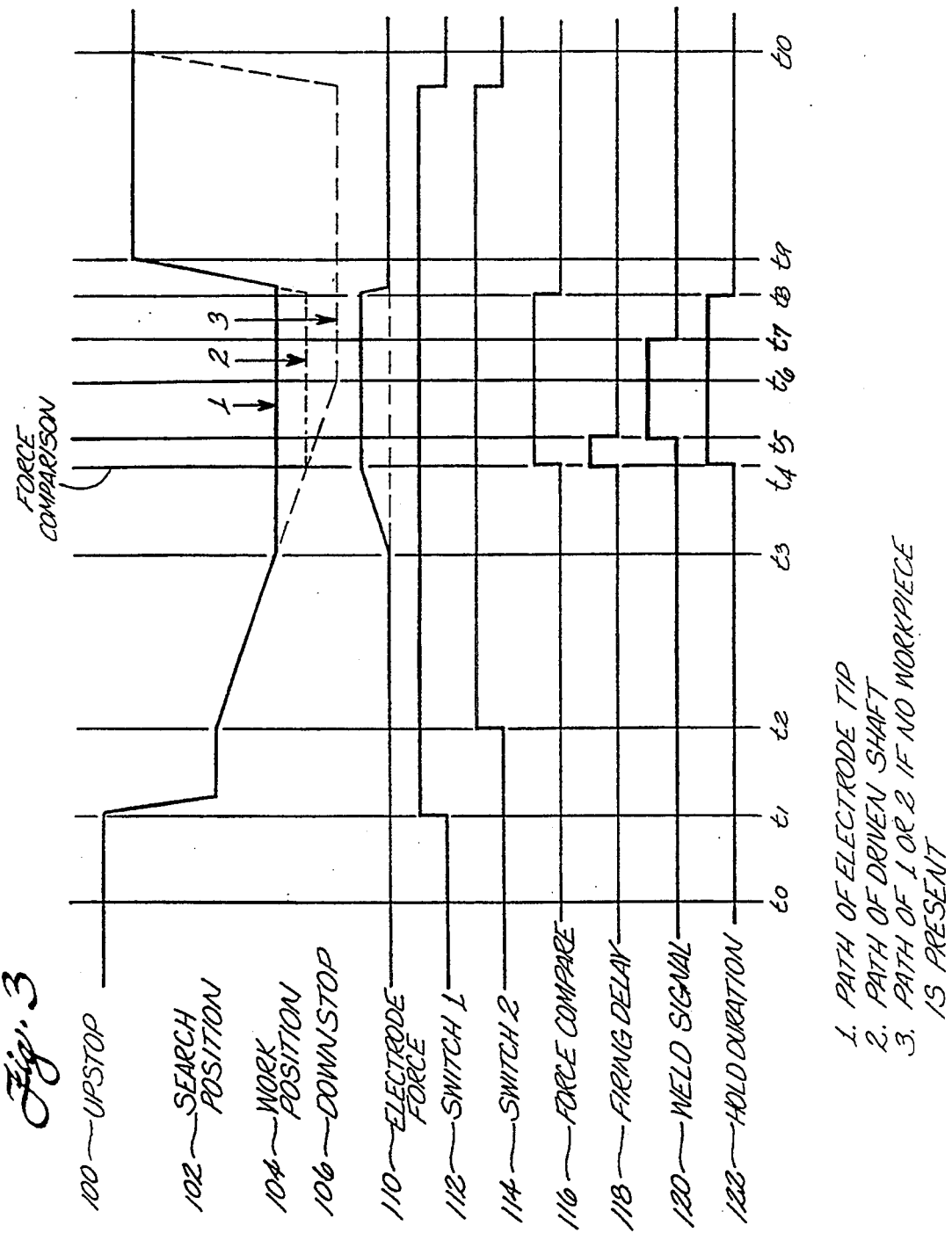
FIG. 3 is a timing diagram for the weld head apparatus shown in FIG. 1 showing the actions and timing intervals of the various operations of the apparatus during a typical weld cycle.

In order to further describe the essential features of the motorized weld head, an example of a typical weld cycle will now be described by reference to the timing diagram of FIG. 3.

During a typical weld cycle, at initial time t0, the user will place the workpiece 46 to be welded directly underneath the upper electrode 38. At this time the welding apparatus will be positioned at an upstop position 100, a predetermined position representing the minimum displacement of the driving shaft along the z-axis relative to the DC motor. At time t1, by depressing a weld cycle start switch 88 such as a foot pedal to change the state of the switch 112, the user, via the control system, will drive the welding electrode 38 downwardly from the upstop position to a search position 102 slightly (e.g., three thousandths of an inch) above the maximum height of the workpiece 46.

At time t2, by depressing a search position descent switch 86 such as a second level of the foot pedal, the switch will change state 114. The welding electrode will proceed downwardly (indicated by path 1) from the search position toward the workpiece. At time t3, assuming the workpiece is aligned axially with respect to the electrode 38, the electrode will engage the workpiece. Due to the rigidity of the workpiece, the electrode will cease to move further downward. However, the driven output shaft 36 will continue to proceed downwardly (indicated by path 2) both compressing the spring assembly between the shaft and the electrode and increasing the force exerted on the workpiece by the electrode. Also at t3, when the load cell 48 senses the electrode force 110 via the compression of the spring assembly 44, the load cell will output a voltage signal into the force comparator 76.

At time t4, the electrode force 110 sensed by the load cell equals that of the force program 78. The comparator changes state 116 triggering both the hold delay 22 and the firing delay 118. The hold delay maintains the constant force specified in the force program between the electrode and the workpiece. At time t5, after any mechanical vibration of the electrode has adequately diminished, the firing delay 118 switches off. Simultaneously the weld signal 120 switches on, enabling current flow to the electrode tip. At time t6, the weld signal ends and the current is stopped. However, the hold signal continues to maintain a constant applied force to the workpiece as the molten metal cools. At time t8 the hold signal ends, the force comparison ceases, and the electrode rises releasing the force applied to the workpiece. At time t9, the welding apparatus automatically returns to the upstop position under direct control of the servo loop. Finally, by time t10, all switches have returned to their initial positions, marking the end of the weld cycle.

If no workpiece is encountered by the electrode, the output shaft and the electrode will travel to a predetermined downstop position 106 at time t7 (indicated by path 3). This downstop position represents a predetermined displacement point of the driving shaft relative to the motor along the downward z-axis. Since no force is built up to initiate the completion of the cycle, the electrode will remain at the downstop position until the weld cycle switch 88 changes state 114 ending the weld cycle. Thus, the control system provides means to precisely control welding parameters.

Figure 5:
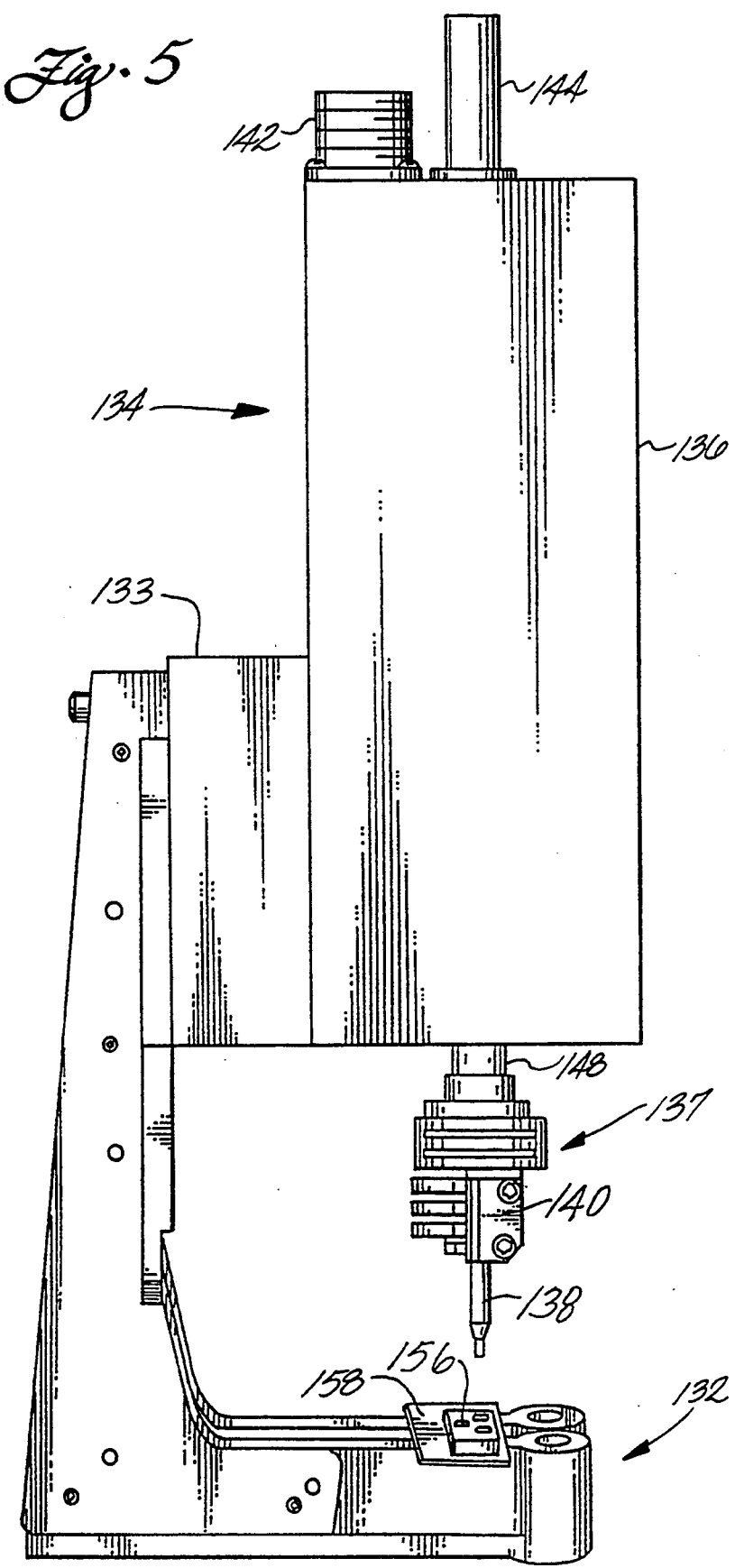
FIG. 5 is a side elevation showing a presently preferred embodiment of a fast response weld head apparatus utilizing a linear actuator according to the present invention.

In another and presently preferred embodiment of the invention, a fast response weld head apparatus according to the present invention incorporates a linear actuator which enables a user to control critical parameters of a weld cycle. In FIG. 5, a presently preferred embodiment of the subject weld head apparatus provides a welding electrode to be moved upwardly and downwardly to precise locations along the z-axis of the electrode at a variable speed under control of a linear actuator. As a result of microprocessor control, both the rate of force and the amount of force the electrode exerts on a workpiece can be varied and controlled as required for optimum welding.

The various components of the weld head 130 will first be described. Referring to FIG. 5, a support for the weld head comprises a base 132 on which a housing 134 is fixedly mounted by means of a spacer block 133. Housing 134 supports a linear magnetic actuator 136 which moves a welding apparatus 137. The welding apparatus includes a welding electrode 138 and an electrode holder 140. Weld apparatus controls including a keyboard and a foot pedal are utilized similar to those shown in FIG. 4, and are connected to multipin connector 142. A position transducer 144, for measuring the position of the electrode relative to the workpiece, is also mounted on housing 134.

A non-rotatable output shaft 148 extends from beneath actuator 136 and provides a mechanical connection between the actuator drive and the welding portion of the weld head apparatus. As the shaft is displaced, shaft bearings (not shown) allow linear motion of output shaft 148. The welding portion, comprising electrode 138 secured by electrode holder 140, is attached to the output shaft 148. As the actuator 136 drives the welding apparatus downward on cue from the control system the electrode contacts a rigid workpiece 156 on work table 158. The electrode exerts a downward z-axis force on the workpiece.

In contrast with the motorized weld head embodiment the path of the driven shaft and the electrode shaft are the same. In this embodiment the spring compliance in the weld shaft is replaced with a programmable transient force. The follow-up spring has been eliminated and the force required to keep constant pressure on the softened workpiece is supplied by a short pulse of force, that accelerates the relatively large mass of the weld head in a short time.

An important characteristic feature of a linear magnetic actuator is its linear force response to an increase or decrease in current supplied to the actuator which means direct control of the force exerted by control of the current supplied to the actuator and by provision of predetermined current profiles for the actuator. This enables control of electrode velocity prior to the welding operation and control of the electrode force during the welding operation. Control of electrode velocity enables the obtaining of a low impact by the electrode when it contacts the workpiece thereby preventing damage to the workpiece and eliminating movement of the workpiece in the welding fixture. Control of electrical force enables increasing or ramping up the force applied by the electrode at a controlled rate to control the seating of workpieces relative to one another for improved weld quality. Since electrode force is determined electronically, predetermined force values and force profiles can be stored by a microprocessor as part of the overall weld schedules. This means that the desired force profiles can automatically be selected whenever a different weld schedule is selected.

As indicated, a characteristic of a linear magnetic actuator is its rapid response time. A rapid increase in applied force can be obtained in extremely short intervals of 1 to 3 milliseconds by increasing the current to the actuator which in turn causes rapid acceleration of the electrode so that it maintains contact with the workpiece as it becomes plastic or molten during the welding operation. Control of electrode contact with the workpieces eliminates the tendency to cause molten or plastic portions of the workpiece to be expelled from the weld site.

Other advantages of the present invention are increased efficiency and speed of operation. With a magnetic linear actuator, the time required to ramp up to and down from a desired force is reduced in comparison to prior art welders. In welding applications requiring many repetitive welds on the same workpiece, this fast response of a linear actuator and the weld head provides increased production rates and savings in time and expense by enabling quicker setups and welds and more welds per unit time.

In operation the weld electrode moves to the search position, and then to the level of the workpiece. As contact is made with the workpiece, the electrode force signal, from the microprocessor 159, is ramped up at a programmed rate until the programmed force is reached. Since the magnetic actuator has a very linear current vs. output force curve, the force is no longer monitored by a transducer. The magnetic actuator is programmed with the correct current profile to produce the desired force profile. Upon reaching the programmed force, a weld signal is sent to the welding power supply and weld current is supplied to the weld electrode and workpiece. A slight delay of 1 to 10 milliseconds is programmed in to allow the workpiece time to soften (transient force delay) and then the transient force is produced for just enough time to accelerate the mass of the electrode mechanism to follow the collapse of the weld.

The force exerted by the weld electrode is then returned to normal for the remainder of the weld, which cools rapidly as the weld current decreases. After the hold duration expires, weld force is removed, and the electrode returns to an upstop position in preparation for the next weld. The next weld can only begin after switches 186 and 188 are released and reactuated.

A control system for operating the linear magnetic actuator weld head apparatus which allows the user direct control of critical welding parameters will now be described.

Figure 6:
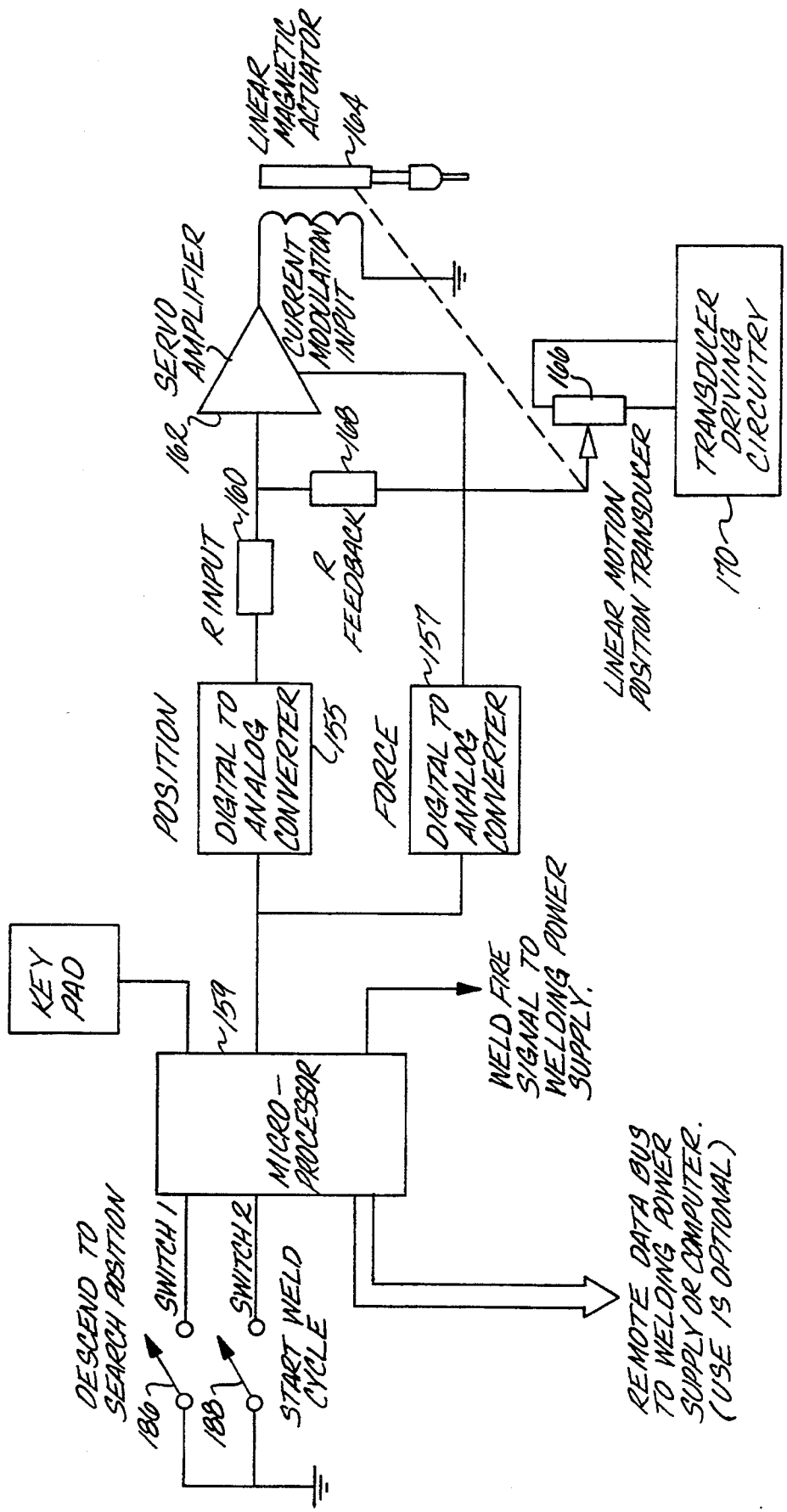
FIG. 6 is a block diagram of the control system for the weld head apparatus of FIG. 5.

A block diagram illustrating the control system is shown in FIG. 6. The user control means allows the user to command the operation of the weld head either directly, with control apparatus such as a keyboard with a display and a foot pedal or automatically, with a computer program. Regardless of the means used, the speed, force, duration, and position of the welding apparatus may effectively be controlled. A microprocessor 159 controls the electrode force signal. For example, as the generator receives a command from the user control to increase the speed of the welding apparatus between desired positions, the generator will produce a proportionally increased voltage ramp signal. This voltage ramp produced by the generator is one component of the input voltage to the servo loop circuit.

The servo loop circuit, an essential feature of this control system, comprises a position digital to analog converter 155, a force digital to analog converter 157, input resistor 160, servo amplifier 162, linear magnetic actuator 164, linear motion position transducer 166, and feedback resistor 168. As the input voltage enters the servo loop, it first encounters servo amplifier 162 which augments the voltage signal in order to sufficiently power the actuator 164. The voltage delivered to the actuator is controlled by microprocessor 159. The actuator drives the welding apparatus upwardly and downwardly along the z-axis. The position transducer 161, independently powered by transducer driving circuitry 170, precisely measures the displacement of the welding apparatus and outputs a voltage signal proportional to the said displacement directly into the feedback loop via feedback resistor 168. The feedback voltage signal provides a second component of input voltage to the servo amplifier in addition to that produced by the microprocessor. The effect of the feedback loop is that a instantaneous preferred steady state position of the welding apparatus will be maintained by the servo loop. If the position transducer senses that the welding apparatus is displaced from its instantaneous steady state position, the fundamental operation of the servo loop will drive the apparatus back toward the correct position.

Figure 7:
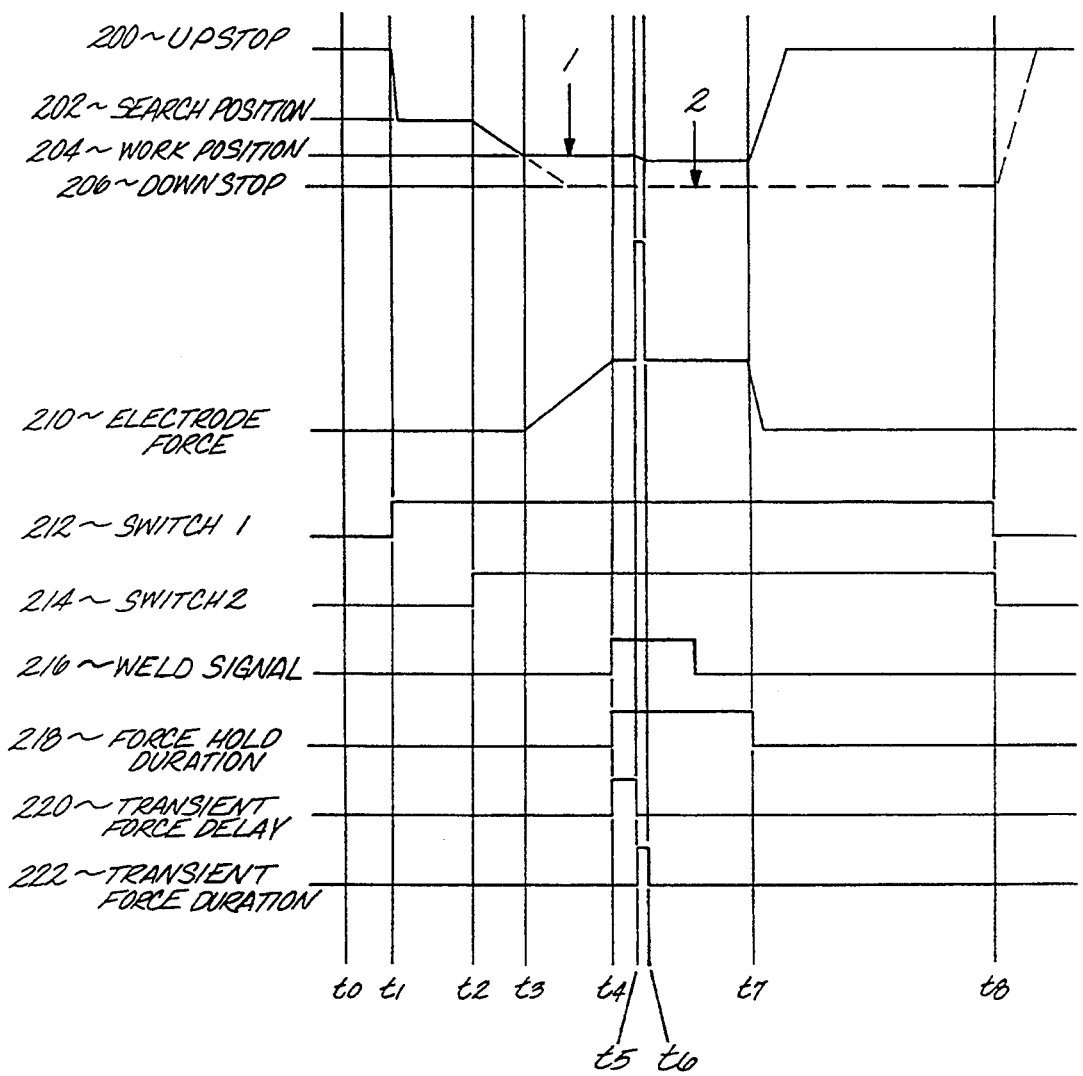
FIG. 7 is a timing diagram for the weld head apparatus shown in FIG. 5 showing the actions and timing intervals of the various operations of the apparatus during a typical weld cycle.

The position transducer and associated circuitry in conjunction with the actuator senses the downstop position when the electrode contacts the workpiece. A change of length in the welding electrode automatically results in a new downstop position. Because of the programming and sensing capabilities of the linear magnetic actuator and transducer, the actuator will automatically react to stop a welding operation when the electrode fails to begin exerting a force at the expected location or prematurely experiences a contact prior to the expected location. In either event, the actuator aborts the welding operation before workpieces are harmed allowing an operator to investigate the cause of the problem. The force program, as well as the entire means for sensing force in combination with the servo loop, is an important feature of the control system. The force program is a preprogrammed or user controlled means of producing a current level which represents the optimum force to be applied by the welding apparatus on to the workpiece. The force program can be programmed either for simple constant force welding applications or, if necessary, for more complex variable force applications. In order to further describe the essential features of the linear actuator weld head, an example of a typical weld cycle will now be described by reference to the timing diagram of FIG. 7.

During a typical weld cycle, at initial time t0, the user will place the workpiece 156 to be welded directly underneath the weld electrode. At this time the welding apparatus will be positioned at an upstop position 200, a predetermined position representing the minimum displacement of the driving shaft along the z-axis relative to the linear actuator. At time t1, by depressing a weld cycle start switch to change the state of the switch 212, the user, via the control system, will drive the welding electrode 138 downwardly from the upstop position to one of a selection of possible search positions 202 slightly (e.g., three thousandths of an inch) above the maximum height of the workpiece 156.

At time t2, by depressing a search position descent switch 186 such as a second level of the foot pedal, the switch will change state 214. The welding electrode will proceed downwardly (indicated by path 1) from the search position toward the workpiece. At time t3, assuming the workpiece is aligned axially with respect to the electrode 138, the electrode will engage the workpiece. Due to the rigidity of the workpiece, the electrode will cease to move further downward. At t3, the electrode force rate begins to increase and reaches the programmed force at t4.

At time t4 the weld signal 216 is applied and the onset of the force hold duration 218 begins. The programmed transient force delay 220 also is initiated and extends to t5. At t5 the transient force increase is applied for a short duration of 1 to 10 milliseconds until t6 when the transient force is terminated. The electrode force then returns to normal until t7 when the electrode is raised again to the upstop position.

The described embodiment of the invention is only considered to be preferred and illustrative of the inventive concept; the scope of the invention is not to be restricted to such embodiment. Various and numerous other arrangements may be devised by one skilled in the art. For example, all of the user controls could take the form of a computer program, capable of producing numerous and complex welding operations automatically. An analog current can also be utilized to provide control signals in lieu of a microprocessor. Furthermore, a lower electrode may be employed on the apparatus for welding various sides of a workpiece simultaneously. Still another drive mechanism which can be utilized in lieu of a magnetic linear actuator is a piezoelectric traction motor.

What is claimed is:

1. A method of rapid precision welding of an object comprising the steps of:
   (a) providing a movable electrode;
   (b) moving the electrode into contact with the object using a fast response weld head on which the electrode is mounted;
   (c) increasing the force exerted by the electrode to a first predetermined level;
   (d) applying electrical welding energy through the electrode to the object for a predetermined duration of time;
   (e) holding the force exerted at said first level for a first length of time as the object softens;
   (f) increasing the force exerted to a second predetermined level for a second shorter length of time; and
   (g) returning the electrode force to said first predetermined level during the remaining portion of the interval of application of weld energy wherein the electrode maintains contact with the object at all times during welding eliminating expulsion of material.

2. The method of claim 1 further comprising the steps of:
   moving the electrode to a search position;
   thereafter moving the electrode into contact with the object;
   increasing the force applied to the object to the first predetermined level of force at a preprogrammed rate;
   sending a weld signal to a welding power supply to deliver electrical energy to the object; and thereafter
   releasing the force on the object after a preprogrammed length of time.

3. The method of claim 2 further comprising the step of applying a second higher predetermined level of force to the object during the delivery of energy to the object.

4. The method of claim 3 wherein the fast response weld head is driven by a linear magnetic actuator.

5. The method of claim 1 in which the steps of obtaining force, position, speed and duration control are generated by a microprocessor, an analog circuit or computer control.

6. In a fast response weld head, control means comprising:
   means for selecting a force to be applied by an electrode on an object to enable low impact contact;
   means for varying the speed of movement of the electrode relative to the object;
   means, comprising a linear magnetic actuator, for varying the level of force exerted by the electrode on the object; and
   means for increasing the force exerted by the electrode on the object at a predetermined rate prior to the start of weld energy wherein control of the speed of the electrode enables low impact contact with the object minimizing movement of and damage to the object.

7. The apparatus of claim 6, in which the means for controlling the force, position speed of the electrode are under the control of a microprocessor, an analog circuit or computer control.

8. The apparatus of claim 7 including a position transducer for measuring the displacement of the electrode.

9. The apparatus of claim 8 in which the means for varying the speed of movement of the electrode is a linear magnetic actuator.

10. The apparatus of claim 9 in which one input to the control means comprises the force control signal.

11. The apparatus of claim 9 in which another input into the control means comprises the position control signal.

12. A method of rapid precision welding of an object by an electrode with user-controlled parameters comprising:
   (a) providing a movable electrode;
   (b) generating a speed control signal defining a rate of motion of the electrode;
   (c) generating a predetermined force control signal defining a first force to be applied to the object by the electrode;
   (d) generating a position control signal defining a displacement of the electrode relative to the object;
   (e) generating a duration control signal defining a length of time the electrode contacts the object;
   (f) driving the electrode toward and into contact with the object;
   (g) rapidly increasing the force applied by the electrode after contact;
   (h) applying welding energy to the object through the electrode for a predetermined interval;
   (i) generating a transient force greater than said first force for a brief interval during the weld energy interval and prior to the end of the time interval when the electrode contacts the object; and
   (j) rapidly decreasing the force applied by the electrode after the weld energy interval to minimize the overall time interval of each welding operation.

13. In a fast response weld head, force controlling means comprising:
   means for programming a prescribed force control signal representative of a force to be applied by an electrode on an object; and
   means, comprising an open loop control circuit, for programming a transient force applied by the electrode to the object; and
   means for maintaining the prescribed force and transient force exerted by the electrode on the object for predetermined intervals.

14. The apparatus of claim 13, in which the means for programming the forces applied by the electrode to the object comprises a microprocessor, an analog circuit or computer control.

15. The apparatus of claim 14 wherein the microprocessor is programmed with a plurality of weld schedules and corresponding force profiles whereby the required profile is automatically determined by selection of each weld schedule.

16. A fast response weld head comprising:
a support means;
means for mounting a movable shaft on the support means permitting motion of the shaft relative to the support means;
driving means, comprising a liner magnetic actuator, for moving the shaft linearly with respect to the support means;
operator controlled means for controlling a force to be exerted by the weld head;
means for maintaining the operator controlled force between the electrode and the workpiece for a predetermined duration; and
means for applying a transient amount of force during the force maintaining interval.

17. The apparatus of claim 16, in which the driving means comprises a magnetic linear actuator connected to a weld electrode.

18. The apparatus of claim 17, in which the operator controlled means comprises apparatus which generates a signal indicative of a desired force value.

19. The apparatus of claim 18, in which another operator controlled means enables a weld current to the electrode.

20. A fast response weld head comprising the combination of a control system attached to magnetic linear actuator means, driving means attached to the actuator means, and welding means attached to the driving means.

21. The apparatus of claim 20, in which the welding means comprises a welding electrode, mounting means for the welding electrode, and enabling means for providing a current to the electrode.

22. The apparatus of claim 21, in which the enabling means comprises means to control the amount of current provided to the electrode.

23. A fast response weld head comprising:
a servo control means for controlling position of an electrode relative to an object;
detecting means coupled to the servo control means for detecting electrode contact with the object;
open loop control means for controlling the force exerted by the electrode in response to a current; and
control switching means coupled to the detecting means for changing control of the electrode from the servo control means to the open loop control means upon detection of electrode contact with the object.

* * * * *